(12) United States Patent
Edwards et al.

(10) Patent No.: US 12,085,377 B2
(45) Date of Patent: Sep. 10, 2024

(54) METHOD AND SYSTEM FOR IMPROVED MOTION ROBUSTNESS DURING LOCATION MEASUREMENT

(71) Applicant: KONINKLIJKE PHILIPS N.V., Eindhoven (NL)

(72) Inventors: Martin John Edwards, Solihull (GB); Gerben Kooijman, Leende (NL); Dionisio Massingo Numes, Utrecht (NL); Wilhelmus Johannes Everardus Evers, Eindhoven (NL); Steven Charles Deane, Cambridge, MA (US); Vincent Jeanne, Migne Auxances (FR); Filipe Maia Masculo, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1042 days.

(21) Appl. No.: 16/976,781

(22) PCT Filed: Feb. 26, 2019

(86) PCT No.: PCT/EP2019/054640
§ 371 (c)(1),
(2) Date: Aug. 31, 2020

(87) PCT Pub. No.: WO2019/166386
PCT Pub. Date: Sep. 6, 2019

(65) Prior Publication Data
US 2021/0010800 A1 Jan. 14, 2021

Related U.S. Application Data

(60) Provisional application No. 62/636,900, filed on Mar. 1, 2018.

(51) Int. Cl.
*G01B 11/00* (2006.01)
*A46B 9/04* (2006.01)
(Continued)

(52) U.S. Cl.
CPC ............. *G01B 11/002* (2013.01); *A46B 9/04* (2013.01); *A46B 15/0006* (2013.01);
(Continued)

(58) Field of Classification Search
CPC ..... G01B 11/002; A46B 9/04; A46B 15/0006; A46B 15/0008; A46B 2200/1066;
(Continued)

(56) References Cited

U.S. PATENT DOCUMENTS 8,690,579 B2   4/2014 Ikkink
8,744,192 B2   6/2014 Ortins
(Continued)

FOREIGN PATENT DOCUMENTS

DE   102011103301 A1   12/2012
DE   102016002855 A1   9/2017
(Continued)

OTHER PUBLICATIONS

International Search Report Jun. 7, 2019.
Silicon Labs Si1102 and Si1120 Designer's guide, AN442, Silicon Laboratories, Rev. 0.1 1/15, pp. 1-21.

*Primary Examiner* — Vu Le
*Assistant Examiner* — Winta Gebreslassie

(57) ABSTRACT

A method (200) for determining a position and an orientation of a portion of a handheld personal care device relative to a user's body (50), comprising: providing (210) a handheld personal care device comprising at least one energy source (20) and at least one detector (22), both the at least one energy source and the at least one detector located within the handheld personal care device, the at least one energy source arranged at a first position and having a first orientation within the handheld personal care device; emitting (220) energy in a three dimensional space surrounding the handheld personal care device; detecting (230) a portion
(Continued)

of the energy emitted; generating (240) sensor data; extracting (250) one or more features from the generated sensor data; and estimating (260) a position and an orientation of a portion of the handheld personal care device relative to the user's body based on the extracted one or more features.

19 Claims, 12 Drawing Sheets

(51) Int. Cl.
    *A46B 15/00*     (2006.01)
    *A61C 15/04*     (2006.01)
    *A61C 17/02*     (2006.01)
    *A61C 17/22*     (2006.01)
    *G01P 13/00*     (2006.01)

(52) U.S. Cl.
    CPC ........ *A46B 15/0008* (2013.01); *A61C 15/046* (2013.01); *A61C 17/0202* (2013.01); *A61C 17/22* (2013.01); *G01P 13/00* (2013.01); *A46B 2200/1066* (2013.01)

(58) Field of Classification Search
    CPC ... A61C 15/046; A61C 17/0202; A61C 17/22; G01P 13/00
    See application file for complete search history.

(56) References Cited

U.S. PATENT DOCUMENTS

| | | | |
|---|---|---|---|
| 2010/0170052 A1* | 7/2010 | Ortins | ............... A63F 13/213 15/106 |
| 2011/0275424 A1 | 11/2011 | Schmid | |
| 2015/0044629 A1 | 2/2015 | Wang | |
| 2015/0230593 A1 | 8/2015 | Doll | |
| 2015/0230594 A1 | 8/2015 | De Vries | |
| 2016/0037903 A1 | 2/2016 | Lal | |
| 2017/0069083 A1 | 3/2017 | Vetter | |
| 2017/0188836 A1 | 7/2017 | Xi | |
| 2020/0359777 A1* | 11/2020 | Pesach | ............... A61C 9/006 |
| 2021/0177130 A1* | 6/2021 | Jeanne | ............... A46B 15/0012 |

FOREIGN PATENT DOCUMENTS

| | | |
|---|---|---|
| WO | 2011077282 A1 | 6/2011 |
| WO | 2017001399 A1 | 1/2017 |
| WO | 2017002004 A1 | 1/2017 |
| WO | 2017102859 A1 | 6/2017 |
| WO | 2017145033 A1 | 8/2017 |

* cited by examiner

METHOD AND SYSTEM FOR IMPROVED MOTION ROBUSTNESS DURING LOCATION MEASUREMENT

This application is the U.S. National Phase application under 35 U.S.C. § 371 of International Application No. PCT/EP2019/054640, filed on Feb. 26, 2019, which claims the benefit of U.S. Provisional Application No. 62/636,900 filed Mar. 1, 2018. These applications are hereby incorporated by reference herein.

FIELD OF THE INVENTION

The present disclosure is directed generally to methods and systems for determining position and/or orientation information of a handheld personal care device relative to a user's body that is robust to user motion and variation in user characteristics.

BACKGROUND

Determining position and/or orientation information of a handheld personal care device and its constituent parts relative to a user's body enables monitoring and coaching in personal cleaning or grooming regimens such as tooth brushing and interdental cleaning, face cleansing or shaving, and the like. For example, if the location of a head member of a personal care device is determined within a user's mouth, portions of a group of teeth, a specific tooth, or gum section may be identified so that the user can focus on those areas.

To facilitate proper cleaning techniques, some devices contain one or more sensors to detect location information of a handheld personal care device during a use session. Existing methods and devices detect orientation of a hand held personal care device using an inertial measurement unit, such as in power toothbrushes. However, the orientation data in the current devices does not uniquely identify all particular locations in the oral cavity. Thus, to locate the head member portion in a particular area of an oral cavity, the orientation data must be combined with guidance information. To enable this technology, user must carry out a certain period of a use session while following the guidance information to locate the head member portion within a certain segment of the mouth. Since this technology is based on orientation of the handheld personal care device relative to the world, movements associated with use of the device cannot be differentiated from non-use movements (e.g., walking or turning head). As a result, a user is forced to limit his or her movement while operating the handheld personal care device if accurate location data is desired. Approaches which simply detect the presence or absence of skin in front of a sensor fail to account for user behavior which can vary over time for an individual user and/or varies between users.

Accordingly, there is a continued need in the art for methods and systems for determining position and/or orientation information of a handheld personal care device relative to a user's body that is robust to user motion and variation in user characteristics.

SUMMARY OF THE INVENTION

The present disclosure is directed to inventive methods and systems for accurately determining a position and/or an orientation of a portion of a handheld personal care device relative to a user's body, the position being the location of the device in three dimensional space. Various embodiments and implementations herein are directed to a handheld personal care device including one or more sensors configured to detect the user's body from the handheld personal care device. A controller, including a processor and a non-transitory storage medium for storing program code, is programmed to interpret signals received from the one or more sensors to provide information on aspects of the position and/or orientation of the handheld personal care device relative to the user's body. The spatial characteristics of the sensors and their position and orientation in the handheld personal care device are selected so that additional information can be derived from the signals received from the one or more sensors. In addition, the interpretation of the signals is enhanced by creating an algorithm or inverse function based on knowledge of the spatial characteristics of the sources and detectors combined with knowledge of possible user behavior in terms of position and orientation of the device during application to certain body regions. The inventive systems and methods enable determining a position and/or an orientation of a handheld personal care device relative to a user's body without requiring the user to carry out a certain period of a use session while following guidance information, and/or without requiring that the user limit his or her movement.

Generally in one aspect, a method for determining a position and an orientation of a portion of a handheld personal care device relative to a user's body is provided. The method includes the steps of: (i) providing a handheld personal care device comprising at least one energy source and at least one detector, both the at least one energy source and the at least one detector located within the handheld personal care device, the at least one energy source arranged at a first position and having a first orientation within the handheld personal care device; (ii) emitting, by the at least one energy source, energy in a three dimensional space surrounding the handheld personal care device; (iii) detecting, by the at least one detector, a portion of the energy emitted from the at least one energy source; (iv) generating, by the at least one detector, sensor data based on the detected portion of the energy emitted from the at least one energy source; (v) extracting one or more features from the generated sensor data; and (vi) estimating a position and an orientation of a portion of the handheld personal care device relative to the user's body based on the extracted one or more features.

According to an embodiment, the method further includes the step of detecting energy reflected or scattered from the user's body.

According to an embodiment, the method further includes the step of processing the sensor data generated by the at least one detector to create one or more features which correlate with a position or orientation of the handheld personal care device in use.

According to an embodiment, the method further includes the step of arranging the at least one detector at a second position and having a second orientation within the handheld personal care device, wherein the second position and the second orientation of the at least one detector are different than the first position and the first orientation of the at least one energy source.

According to an embodiment, the at least one energy source is a light-emitting diode and the emitted energy is near infrared light energy and the at least one detector is a photodetector.

According to an embodiment, the at least one energy source and the at least one detector are arranged in a module that is attachable to the handheld personal care device.

According to an embodiment, the method further includes the step of combining a first set of measurements comprising the generated sensor data with a second set of measurements from one or more motion sensors.

According to an embodiment, the method further includes the step of processing the first and second sets of measurements together.

According to an embodiment, the method further includes the steps of processing the first and second sets of measurements separately to form first and second outputs, respectively, and then combining the first and second outputs.

According to another aspect, a method for determining an orientation of a portion of a handheld personal care device relative to a user's body is provided. The handheld personal care device includes the steps of: (1) providing a handheld personal care device comprising at least one energy source and at least one detector, both the at least one energy source and the at least one detector located within the handheld personal care device, the at least one energy source arranged at a first position and having a first orientation within the handheld personal care device; (ii) emitting, by the at least one energy source, energy in a three dimensional space surrounding the handheld personal care device; (iii) detecting, by the at least one detector, a portion of the energy emitted from the at least one energy source; (iv) generating, by the at least one detector, sensor data based on the detected portion of the energy emitted from the at least one energy source; (v) extracting one or more features from the generated sensor data; and (vi) estimating an orientation of a portion of the handheld personal care device relative to the user's body based on the extracted one or more features.

According to an embodiment, the method further includes the step of detecting energy reflected or scattered from the user's body.

According to an embodiment, the method further includes the step of arranging the at least one detector at a second position and having a second orientation within the handheld personal care device, wherein the second position and the second orientation of the at least one detector are different than the first position and the first orientation of the at least one energy source.

According to an embodiment, the method further includes the step of combining a first set of measurements comprising the generated sensor data with a second set of measurements from one or more motion sensors.

According to an embodiment, the at least one energy source and the at least one detector are arranged in a module that is attachable to the handheld personal care device.

According to a further aspect, a method for determining a position of a portion of a handheld personal care device relative to a user's body is provided. The method includes the steps of: (i) providing a handheld personal care device comprising at least one energy source and at least one detector, both the at least one energy source and the at least one detector located within the handheld personal care device; (ii) emitting, by the at least one energy source, energy in a three dimensional space surrounding the personal care device; (iii) detecting, by the at least one detector, a portion of the energy emitted from the at least one energy source; (iv) generating, by the at least one detector, sensor data based on the detected portion of the energy emitted from the at least one energy source; (v) extracting one or more features from the generated sensor data; and (vi) estimating a position of a portion of the handheld personal care device relative to the user's body based on the extracted one or more features.

According to an embodiment, the method further includes the step of characterizing the motion of the personal care device based on the extracted one or more features.

According to an embodiment, a method for characterizing motion of a handheld personal care device relative to a user's body is provided. The method includes the steps of emitting energy in a three dimensional space surrounding the handheld personal care device; detecting, at a plurality of times, a portion of the energy emitted from the at least one energy source which has been reflected or scattered from the user's body; generating a plurality of sensor data, each corresponding to energy detected at a different one of the plurality of times, based on the detected portions of energy; extracting one or more features from the plurality of sensor data; and characterizing motion of the handheld personal care device relative to the user's body based on the features extracted from the plurality of sensor data.

According to an embodiment, the method further comprises comparing the characterized motion to a predetermined motion.

According to an embodiment the method further comprises: generating information on the comparison of the characterized motion with the predetermined motion, and at least one of: communicating the information to the user and storing the information.

According to an embodiment, the characterizing comprises determining the motion of the handheld personal care device relative to the user's body.

According to an embodiment, the motion comprises the movement of the handheld personal care device between a range of first positions near to the body of a user and a range of second positions further from the body of the user than the first positions.

According to an embodiment, the characterizing comprises determining the rate of motion at which the handheld personal care device moves between positions relative to the user's body.

According to an embodiment, the rate of motion is based on the frequency of motion at which the handheld personal care device moves between a range of first positions near to the body of a user and a range of second positions further from the body of the user than the first positions, and wherein the extracted one or more features comprises the frequency of motion.

According to an embodiment, the rate of motion is further based on an amplitude corresponding to the distance between the range of first positions and the range of second positions; and wherein the extracted one or more features comprises the amplitude.

According to an embodiment, the step of characterizing comprises determining whether the frequency of motion is greater than a predetermined frequency.

According to an embodiment, the step of extracting is performed using at least one of: Fourier analysis and band pass filtering.

According to an embodiment, the step of extracting further comprises pre-processing the plurality of data before extracting the features.

According to an embodiment, the pre-processing comprises removing predetermined frequencies from each of the plurality of data before extracting the features.

According to an embodiment, the pre-processing comprises at least one of the following: applying low-pass filtering and adding signals from at least one additional sensor.

According to an embodiment, there is provided a handheld personal care device comprising: at least one energy source for emitting energy towards a user's body and configured to emit energy in a three dimensional space surrounding the handheld personal care device, and being arranged at a first position and having a first orientation within the handheld personal care device; and at least one detector for receiving energy from the user's body in response to emitting energy towards the user's body, configured to detect a portion of the energy emitted from the at least one energy source.

According to an embodiment, there is provided a computer program product comprising code for causing the handheld personal care device to execute the steps of any method described herein.

According to an embodiment, there is provided a controller comprising the computer program product.

According to an embodiment, the handheld personal care device is chosen from a group of handheld personal care devices comprising: an oral care device, a toothbrush, a shaver, an oral irrigator, a flossing device, a body portion for receiving a head member for any of the foregoing devices and a head member for any of the foregoing devices.

According to an embodiment, the controller is in at least one of: the handheld personal care device, a remote server, a remote device, an interface device.

According to an embodiment there is provided a sensing system comprising the handheld personal care device and the controller.

As used herein for purposes of the present disclosure, the term "controller" is used generally to describe various apparatus relating to the operation of a handheld personal care device, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems and methods for determining position and/or orientation information of a handheld personal care device relative to a user's body part that is robust to user motion and variation in user characteristics. More particularly, Applicant has recognized and appreciated that it would be beneficial to apply motion robust location sensing with active sensors to oral care devices to enable coaching of users to improve their cleaning technique, cleaning of all regions with sufficient time spent in each region. Accordingly, the methods described or otherwise envisioned herein provide a handheld personal care device, configured to sense a user's body in combination with an inverse function (algorithm) which translates sensor data into a location of the device relative to the user's body. This technology can be applied to any device for which it is desired to monitor its position relative to the body. The system includes one or more energy emission sources and at least one detector to obtain information about the presence of a user's body. The system also includes a processor configured to translate sensor data with an inverse function (algorithm) into position and/or orientation information of the device relative to the user.

The embodiments and implementations disclosed or otherwise envisioned herein can be utilized with any suitable handheld personal care device. The handheld personal care device may comprise or consist of a body portion, and/or may comprise or consist of a head member removably or non-removably mounted on the body portion. Examples of suitable personal care devices include a toothbrush, a shaver or other grooming device, a flossing device, an oral irrigator, a tongue cleaner, a skin care device, or other handheld personal care device. However, the disclosure is not limited to handheld personal care devices, and thus the disclosure and embodiments disclosed herein can encompass any handheld or personal care device.

Figure 1:
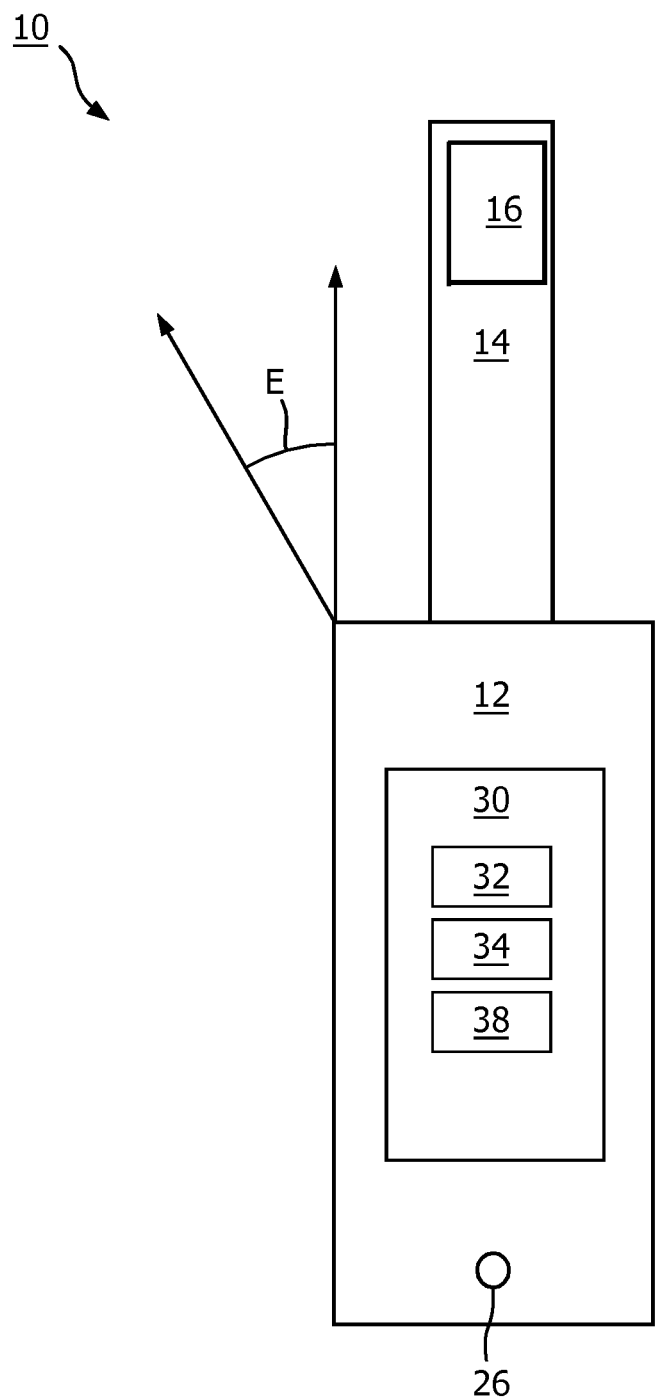
FIG. 1 is a schematic side representation of a handheld personal care device, in accordance with an embodiment.

Referring to FIG. 1, in one embodiment, a handheld personal care device 10 is provided that includes a body portion 12 and a head member 14 removably or non-removably mounted on the body portion 12. The body portion 12 includes a housing, at least a portion of which is hollow, to contain components of the device, for example, a drive assembly/circuit, a controller, and/or a power source (e.g., battery or power cord), not shown. The particular configuration and arrangement shown in FIG. 1 is by way of example only and does not limit the scope of the embodiments disclosed below.

Figure 2:
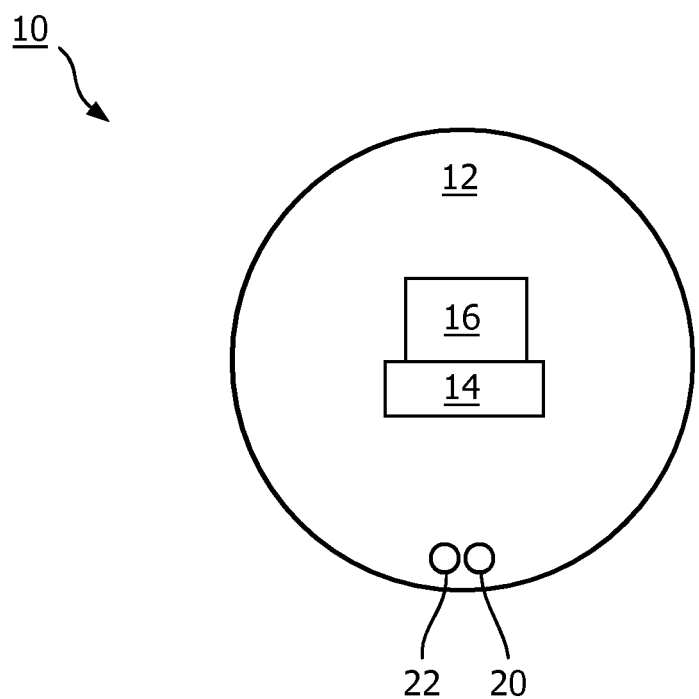
FIG. 2 is a schematic end representation of the handheld personal care device, in accordance with an embodiment.

Handheld personal care device 10 includes one or more energy emission sources 20 and one or more detectors 22 located in the handheld personal care device 10. The energy emission sources and detectors 20, 22 can be directly integrated in the body portion 12 of the device 10 (as shown in FIG. 2). Alternatively, the sources and detectors 20, 22 can be in a device attachment such as head member 14 or a module that can be attached to the device body portion 12. Sources and detectors 20, 22 can be arranged in planar or curved surfaces of the handheld personal care device 10. The sources and/or detectors can be arranged so that they are either outside the mouth during use or inside the mouth during use. The sensors are preferably arranged outside the mouth. Sources and detectors 20, 22 can be mounted together within a single package for ease of assembly in the handheld personal care device 10 or can be mounted separately with different positions and orientations within the handheld personal care device 10. The sources and detectors 20, 22 can be arranged in close proximity to one another, or the sources and detectors 20, 22 can be arranged at a distance from one another.

According to an embodiment, the one or more energy emission sources 20 can be configured to generate near infrared light energy using light emitting diodes and the one or more detectors 22 can be configured to detect the wavelength of light emitted by the one or more energy emission sources 20. The one or more detectors can be photodetectors, for example, photodiodes or phototransistors, with spectral sensitivity which is consistent with detecting the wavelength of the light generated by the one or more energy emission sources 20.

Referring to FIGS. 1 and 2, according to an embodiment, body portion 12 includes a long axis, a front side, a back side, a left side, and a right side. The front side is typically the side of the handheld personal care device 10 that contains the operating components 16 and actuators. Typically, operating components 16 are components such as the bristles of a power toothbrush, the nozzle of a flossing device, the blade of a shaver, the brush head of a face cleansing device, etc. If the operating side is the front side of the body portion 12, the energy source 20 can be located on the back side of the body portion, opposite the front side, at its end proximate to the head member 14. However, the source 20 may be located anywhere within the device along the long axis or around a circumference of the handheld personal care device 10. Similarly, the detector 22 can be located on the back side of the body portion, opposite the front side, at its end proximate to the head member 14. Although FIG. 2 depicts detector 22 located adjacent to the source 20, the detector 22 may be located anywhere within the device along the long axis or around a circumference of the device.

The number of sources and detectors 20, 22 can be equal or unequal and individual sources or detectors can have different characteristics, for example, different angular emission or sensitivity characteristics, depending on their position in order to give the best performance. For example, a handheld personal care device can include four light emitting diodes and a single wide detector. By way of another example, a handheld personal care device can include four light emitting diodes and four corresponding detectors. Although any number of light sources is contemplated, in an example embodiment, a minimum number of three light sources can be included for optimization.

Figure 3:
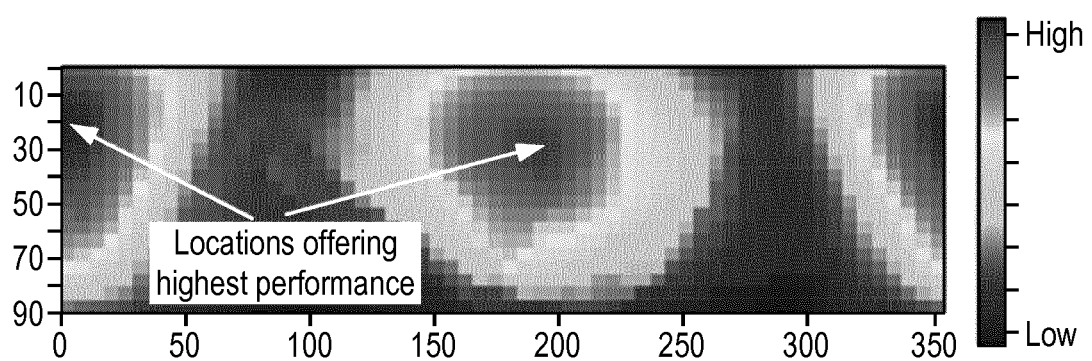
FIG. 3 is a graphical representation of simulated sensor data, in accordance with an embodiment.

As shown in FIGS. 2 and 3, according to an embodiment, the position and orientation of a single sensor in the handheld personal care device 10 (comprising energy emission source 20 and detector 22) affect the device's performance of a position/orientation classification. For example, a position/orientation classification can indicate that if the handheld personal care device 10 is a toothbrush, the operating component, or bristles of the head member are on an inner, chewing, or outer surface of a tooth. In an example configuration including a single sensor, the optimal position and orientation of the sensor is arranged at 0 degrees around the circumference of the handheld personal care device 10, namely, at the back side of the head member 14, opposite from the operating component 16, and at an elevation between 15-35 degrees. In FIG. 1, the elevation E is shown relative to the long axis of the handheld personal care device 10. An elevation of 0 degrees is parallel to the long axis whereas an elevation of 90 degrees is perpendicular to the long axis. Referring back to FIG. 3, which is generated using simulated sensor data derived from measured user behavior and an algorithm based on a machine learning approach, there is a clear optimum in terms of sensor angle and elevation. The x-axis of the graph in FIG. 3 represents sensor angle around the circumference of the body portion 12 (0-360 degrees). The y-axis represents elevation (0-90 degrees from top to bottom). For this configuration including a single sensor, the location offering highest performance is at approximately 0 degrees (or 180 degrees) around the body portion 12 and has an elevation between 15-35 degrees. It should be appreciated that the locations offering highest performance would be different for different types of handheld personal care devices, and different sensor configurations including, for example, additional sensors.

Figure 5:
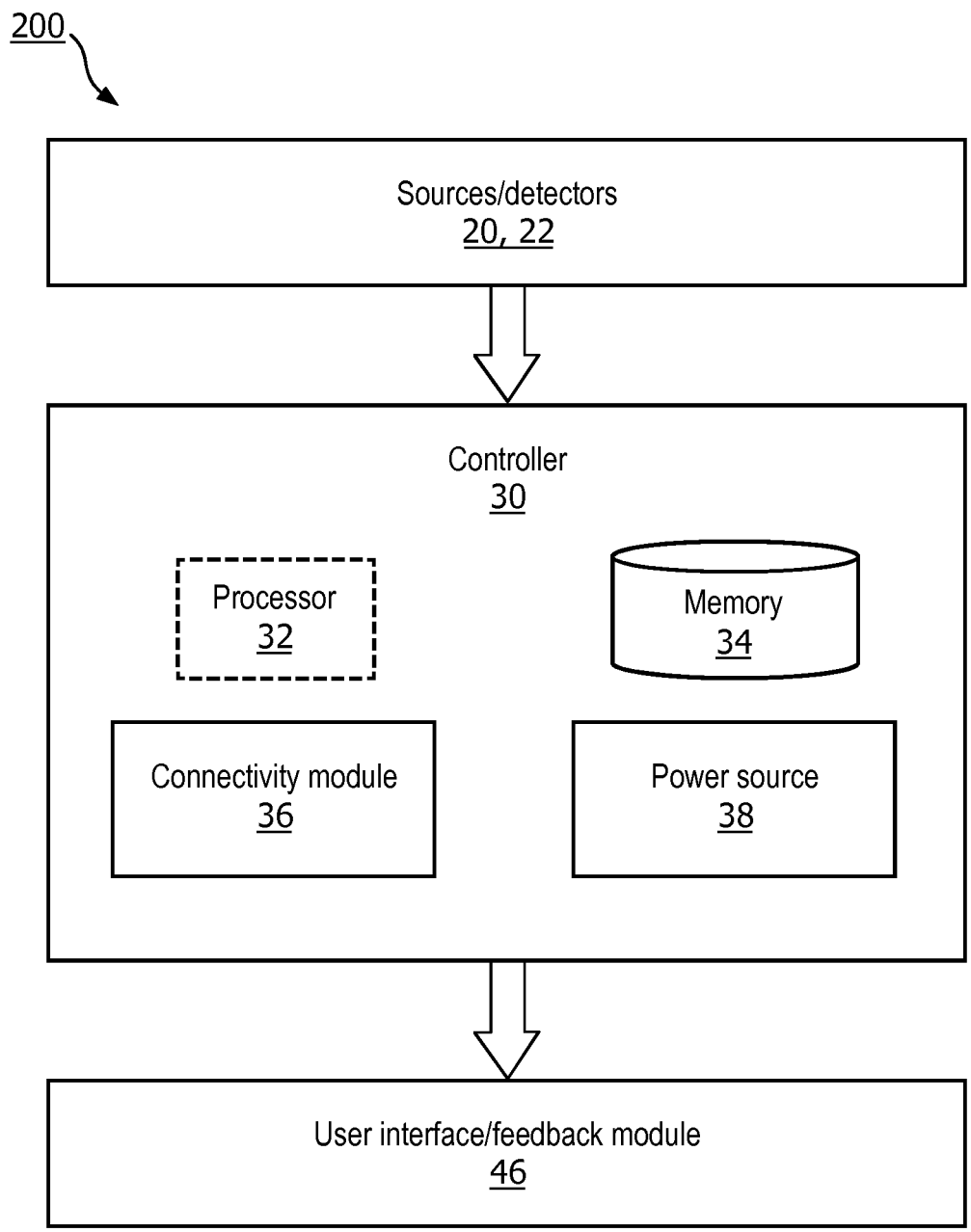
FIG. 5 is a schematic representation of a location sensing system, in accordance with an embodiment

The one or more detectors 22 of handheld personal care device 10 can be configured to generate sensor data and provide such sensor data to a controller 30, such as shown in FIGS. 1 and 5. According to one embodiment, sources and detectors 20, 22 are integral to controller 30. Controller 30 may be formed of one or more modules and is configured to operate the location sensing functionality described herein. Controller 30 can comprise, for example, a processor 32 and a memory or database 34. The processor 32 may take any suitable form, including but not limited to a microcontroller, multiple microcontrollers, circuitry, a single processor, or plural processors. The memory or database 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of device 10. According to an embodiment, a connectivity module 36 transmits collected sensor data, and can be any module, device, or means capable of transmitting a wired or wireless signal, including but not limited to a Wi-Fi, Bluetooth, near field communication, and/or cellular module. According to an embodiment, controller 30 of handheld personal care device 10 receives sensor data generated by the one or more detectors 22, assesses and analyzes that sensor data, and provides information that can be communicated to a user.

Figure 4:
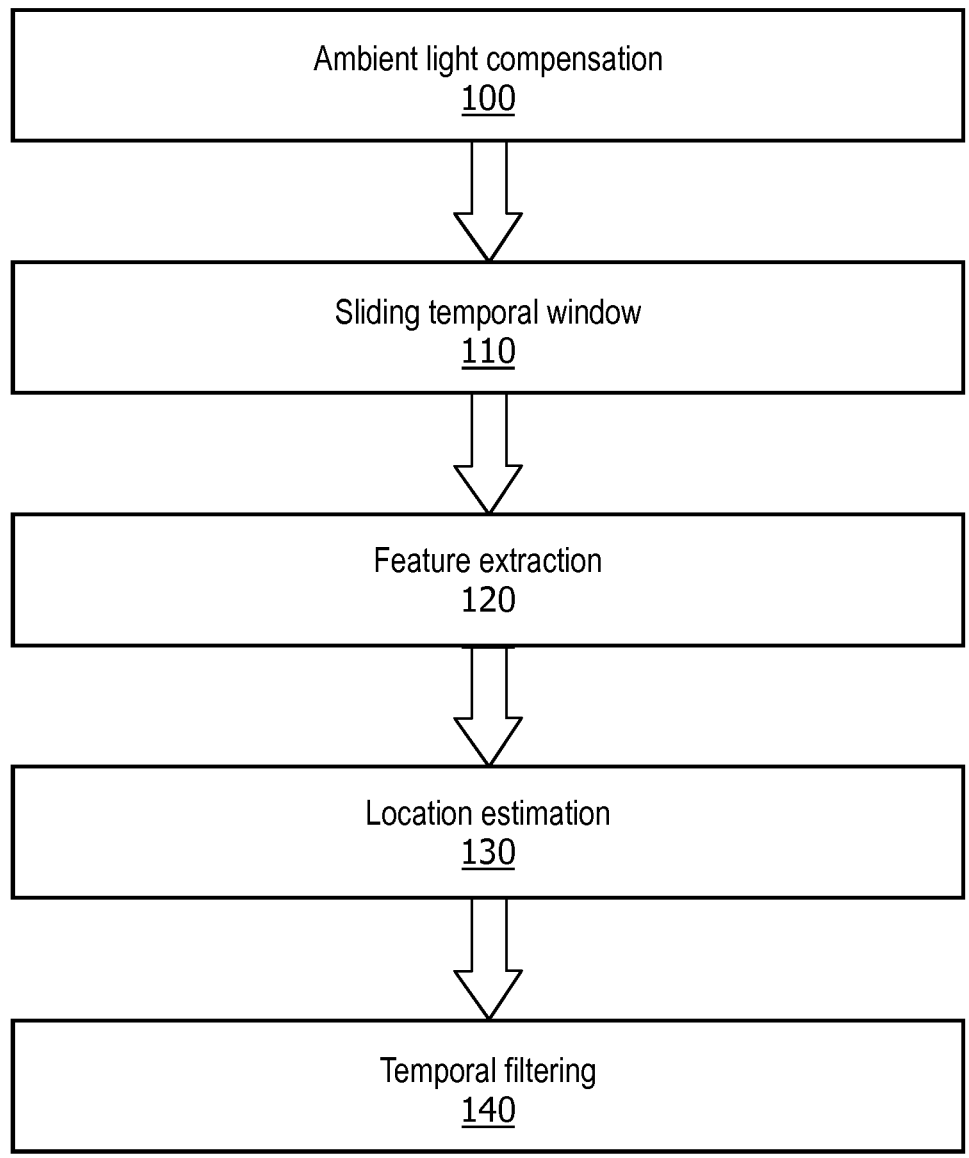
FIG. 4 is a flowchart of the algorithm modules of the location sensing functionality, in accordance with an embodiment.

Referring to FIG. 4, an overview of the algorithm modules of the location sensing functionality is provided. These steps may be performed in real-time or offline (using data previously recorded and stored in memory or database of controller 30). The steps may include actions such as: ambient light compensation 100, sliding temporal window 110, feature extraction 120, location estimation 130, and temporal filtering 140. The ambient light compensation step and the temporal filtering step are optional.

According to an embodiment, the ambient light compensation step 100 is configured, designed, or programmed to remove any influence of ambient light, for example, where the ambient illumination contains light with wavelengths inside the sensitivity range of the detectors, i.e., the detector's measurement of the reflection of the light emitted by the device's light sources may be disturbed by light present in the environment. This corrective mechanism can be achieved, for example, by performing consecutive measurements with the source illumination on and off and subtracting one from the other. Other strategies may include applying modulation to the source's signal and demodulating the signal measured by the detector appropriately.

According to an embodiment, the sliding temporal window step 110 is configured, designed, or programmed to group and process the source/detector measurements in temporal windows along with data from any additional sensors present in the device. These windows may be of any length ranging from one single temporal sample (i.e., only the latest measurement is used) up to several seconds.

According to an embodiment, the feature extraction step 120 is configured, designed, or programmed to extract one or more discriminative features from the sensor data in the measurement window using signal processing.

According to an embodiment, the location estimation step 130 is configured, designed, or programmed to estimate the device's location based on the feature values. In embodiments, this step may include additional calibration parameters as inputs in order to improve the accuracy of predictions. Such calibration parameters may be user-specific parameters, such as parameters related to the user's head geometry. Alternatively, calibration parameters may be device-specific parameters, such as values required for sensor calibration due to variations occurring during the manufacturing process.

According to an embodiment, the temporal filtering step 140 is configured, designed, or programmed to enforce temporal consistency of the output presented to the user. Temporal filtering may be applied to the estimated locations. Such temporal filtering may take the form of a low-pass filter. Alternatively, statistical methods, such as Hidden Markov Models or Kalman filters may be used.

Referring to FIG. 5, in one embodiment, a schematic representation of a location sensing system 200 of handheld personal care device 10 is provided. The location sensing system 200 is an embodiment of handheld personal care device 10, which can be any of the device embodiments disclosed or otherwise envisioned herein. According to an embodiment, location sensing system 200 can be implemented in two or more devices. For example, one or more of the modules or components can be implemented in a remote device, such as a smart phone, tablet, wearable device, computer, or other computing device.

The location sensing system 200 includes a controller 30 having a processor 32 and a memory 34, which can store an operating system as well as sensor data. System 200 also includes energy emission sources and detectors 20, 22 configured to generate and provide sensor data to controller 30. The system 200 can include connectivity module 36 which can be configured and/or programmed to transmit sensor data to a wireless transceiver (not shown). For example, connectivity module 36 may transmit sensor data via a Wi-Fi connection over the Internet or an Intranet to a dental professional, a database, or other location. Alternatively, connectivity module 36 may transmit sensor or feedback data via a Bluetooth or other wireless connection to a local device (e.g., a separate computing device), database, or other transceiver. For example, connectivity module 36 allows the user to transmit sensor data to a separate database to be saved for long-term storage, to transmit sensor data for further analysis, to transmit user feedback to a separate user interface, or to share data with a dental professional, among other uses. Connectivity module 36 may also be a transceiver that can receive user input information, including the above referenced standards (as should be appreciated by a person of ordinary skill in the art in conjunction with a review of this disclosure). Other communication and control signals described herein can be effectuated by a hard wire (non-wireless) connection, or by a combination of wireless and non-wireless connections. System 200 can also include any suitable power source 38. In embodiments, system 200 also includes a user interface 46 which can be configured and/or programmed to transmit information to a user (or receive information from a user). User interface 46 can be or can comprise a feedback module that provides feedback to the user via haptic signal, audio signal, visual signal, and/or any other type of signal.

Figure 8:
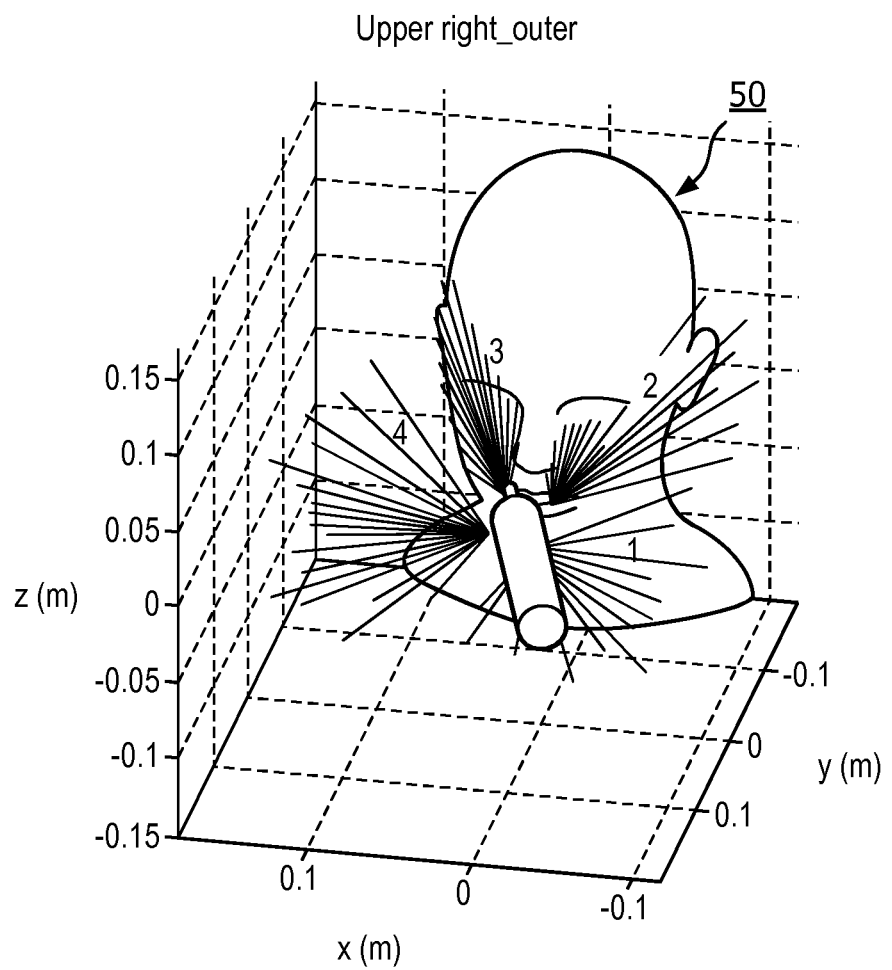
FIG. 8 is a schematic representation of simulated sensor output, in accordance with an embodiment.

According to an embodiment, location sensing system 200 can be programmed and/or configured to determine the position and/or orientation of the handheld personal care device 10 relative to a user's body 50 (such as shown in FIG. 8) during use. As discussed herein, the information or data analyzed or used by system 200 to carry out the functions and methods described herein can be generated by the one or more energy emission sources and detectors 20, 22. For example, system 200 can be programmed and/or configured to effectuate: (i) detection of a user's body within one or more regions of a three dimensional space around the handheld personal care device 10; (ii) generation of sensor data; and (iii) determination of position and/or orientation information of the handheld personal care device with respect to the user's body from the handheld personal care device.

Energy emission sources/detectors 20, 22 can be any of the sensors described or otherwise envisioned herein, and can be programmed and/or configured to generate sensor data regarding one or more aspects of the position and/or orientation of the handheld personal care device relative to the user's body. Controller 30 can receive the sensor data in real-time or periodically. For example, a constant stream of sensor data can be provided by detectors 22 to controller 30 for storage and/or analysis, or may temporarily store and aggregate or process data prior to sending it to controller 30. Once received by controller 30, the sensor data can be processed by processor 32.

Figure 6:
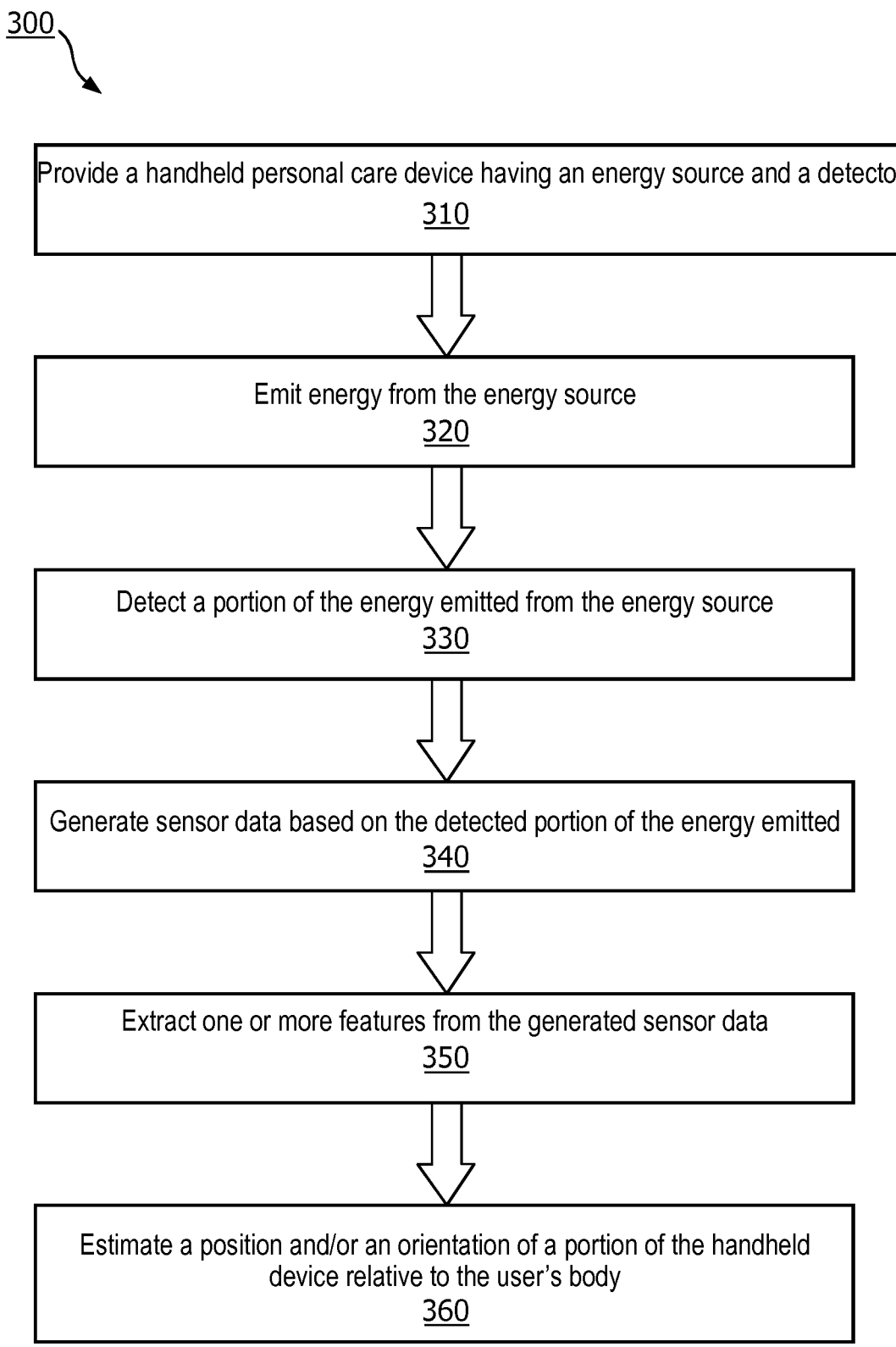
FIG. 6 is a flowchart of a method for location sensing, in accordance with an embodiment.

Referring to FIG. 6, in one embodiment, is a flowchart of a method 300 for determining a position and/or an orientation of a head member 14 of a handheld personal care device 10 relative to a user's body 50. In an example embodiment, the method comprises determining whether a head member of a personal care device that is an oral care device is inside a user's oral cavity or outside the user's oral cavity. While the arrangement of the head member inside the user's oral cavity is one example position, the arrangement of the head member outside the user's oral cavity is another example position. The method takes advantage of the fact that handheld personal care devices are typically held in specific positions and orientations during use. For example, users typically orient a toothbrush with the head member operating component (i.e. bristle) side facing down to clean the top chewing surfaces of the lower teeth. Similarly, users typically orient a toothbrush with the operating component side facing in to clean the outer surfaces of the teeth. However, user behavior can vary significantly over time for an individual and/or between different users. For example, the angle of the toothbrush bristles that a user applies when cleaning a particular tooth surface. The spatial characteristics of the sensors and the dependence of the sensor output on user behavior can be taken into account to create a solution that is effective for a large and diverse population of users. These aspects can be measured with one or more sensors described herein, and this information can be used to determine a position and/or an orientation of the head member relative to a user's body 50.

According to an embodiment, in step 310 of the method, a handheld personal care device 10 is provided. Handheld personal care device 10 may comprise a body handle or body portion 12, a head member 14, a user input 26, and a controller 30 with processor 32. The handheld personal care device 10 also includes one or more sensors comprising energy emission sources and detectors 20, 22. Additional sensors may be included as well, including but not limited to a proximity sensor and other types of sensors, such as an accelerometer, a gyroscope, a magnetic sensor, a capacitive sensor, a camera, a photocell, a clock, a timer, any other types of sensors, or any combination of sensors, including, for example, an inertial measurement unit.

At step 320 of the method, the system or device emits energy from one or more energy emission sources 20 to form one or more regions in a three dimensional space around the handheld personal care device 10 in which parts of the user's body 50 (if present) can be detected. A portion of this energy is scattered or reflected from the surface of the body or from the surface of clothing or other material covering the body. At step 330 of the method, the system or device collects a further part of this reflected or scattered energy by the one or more detectors 22 located in the handheld personal care device 10. The one or more detectors 22 are configured to detect energy from one or more regions in the three dimensional space around the handheld personal care device 10. The intersections of the regions into which light is emitted and from which light is detected define one or more three dimensional regions in space where presence of a body part or something covering a body part influences the data from a particular sensor (as indicated before a sensor comprises a combination of sources and detectors which are operated together to generate an output signal). Lenses, light baffles, or other optical components may be used to modify and/or control the regions of space in which the energy from the one or more energy emission sources is emitted and the regions of space from which the energy reflected or scattered from the body is detected. In embodiments where the one or more energy emission sources 20 emit light, a user's body can become illuminated. According to embodiments, multiple defined sensing regions can be established around the handheld personal care devices by having multiple energy emission sources and detectors.

At step 340 of the method, the system or device generates sensor data. The mechanisms that determine the sensor output are applied during specification of the sensors, namely, selecting the particular configuration of position, orientation, and spatial characteristics of the energy emission sources and detectors. For example, determining that the sensor output depends on distance from the user's body 50 to the energy emission sources and detectors or the extent to which the user's body fills the one or more three dimensional regions in space in which the sensor is sensitive to presence of the body, allows additional information to be derived from the sensor data. The spatial characteristics of the sources and detectors and their position and orientation in the device can be combined with data regarding the positions and orientations of the device during application to certain body regions (such as certain tooth surfaces) to create discriminative features in the generated sensor data.

In an embodiment, data from the one or more detectors 22 can be processed to create features which can act as inputs to an algorithm. In addition, the spatial characteristics of the sources and detectors 20, 22 and their position and orientation in the device 10 are chosen to create features in the data derived from the detectors 22 which are uniquely or strongly correlated with positions and orientations of the device which are required to be differentiated (for example, those involved in cleaning different tooth surfaces). This involves creating specific regions in the three dimensional space around the device in which the presence of the user's body parts modifies the output of the detectors. Knowledge of the spatial characteristics of the sources and detectors is combined with knowledge of possible user behavior in terms of position and orientation of the device during application to certain body regions in order to create an algorithm or inverse function for determining aspects of position and orientation of the device relative to the user's body from the output of the detectors. Different features may be combined in order to create an algorithm which provides additional position/orientation information. The way that the features are combined may be defined using a machine learning approach or a heuristic approach.

Figure 7:
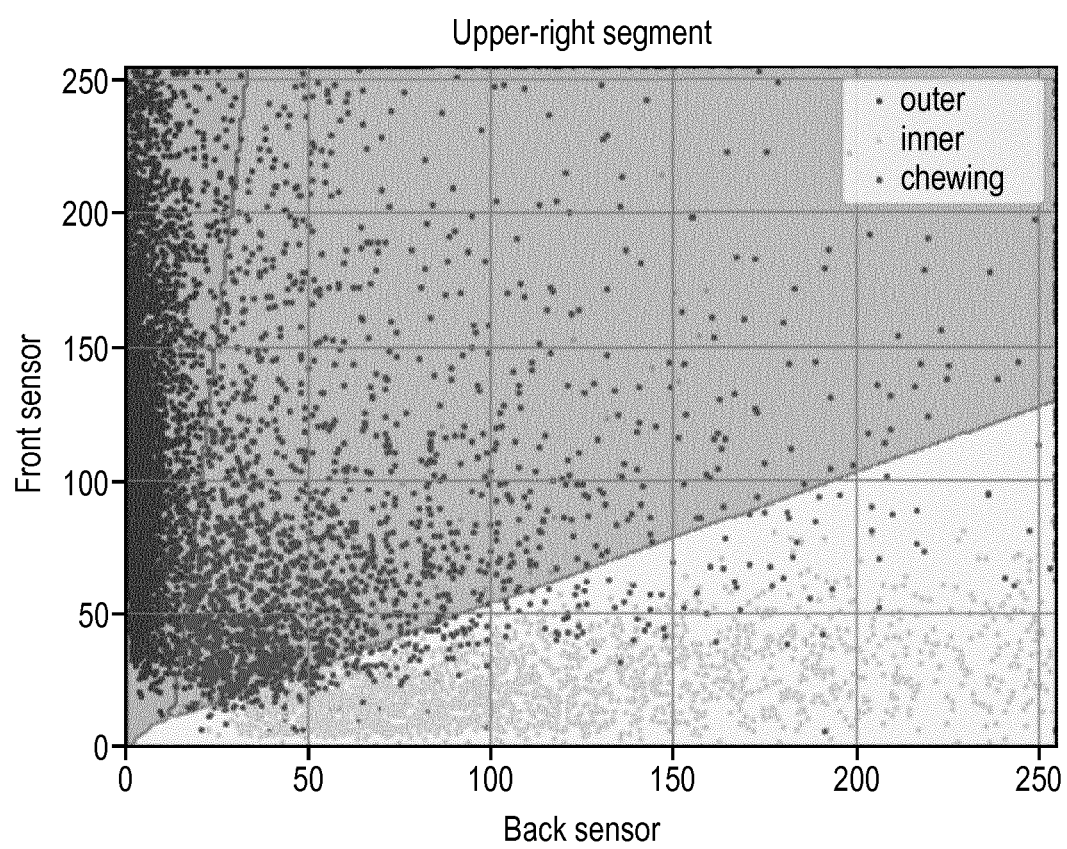
FIG. 7 is a graphical representation of a dataset including measured sensor outputs and the corresponding positions and orientations of the device, in accordance with an embodiment.

In an example embodiment, the inverse function is automatically inferred from a set of labelled training examples. Such training examples take the form of a dataset consisting of sensor outputs as well as the corresponding positions and orientations of the device. For example, using sensor/detector measurements from two sensors, one located at the front side and one at the back side of the handheld personal care device 10, machine learning can be used to detect inner, chewing, and outer tooth surfaces in a user's oral cavity. Although the example uses two sensors, the same approach can be applied for any number of sensors. FIG. 7 shows an example of machine learning using simulated sensor outputs to infer relationships between sensor/detector measurements and device location (outer, inner, and chewing surfaces of the teeth). In FIG. 7, the dots represent training data while the contours represent the inferred classification regions (outer, inner, chewing surfaces).

The sensor outputs used for training can be measured or simulated. Measured sensor outputs can be recorded during use of the device. These can be obtained by tests with a large number of subjects (enabling the creation of a generic model for all users) and/or from the end-user, for example, by requiring the end user to perform one or more training sessions (enabling a personalized model).

Simulated sensor outputs are obtained via simulations. Using a three dimensional head model, for example, it is possible to accurately simulate the sensor outputs for any position and orientation for the device. Therefore, sensor measurements could be simulated at any location of interest either by using an average head model, and/or using a variety of three dimensional head models, and/or using a three dimensional head model corresponding to the head geometry of the end-user.

Figure 9:
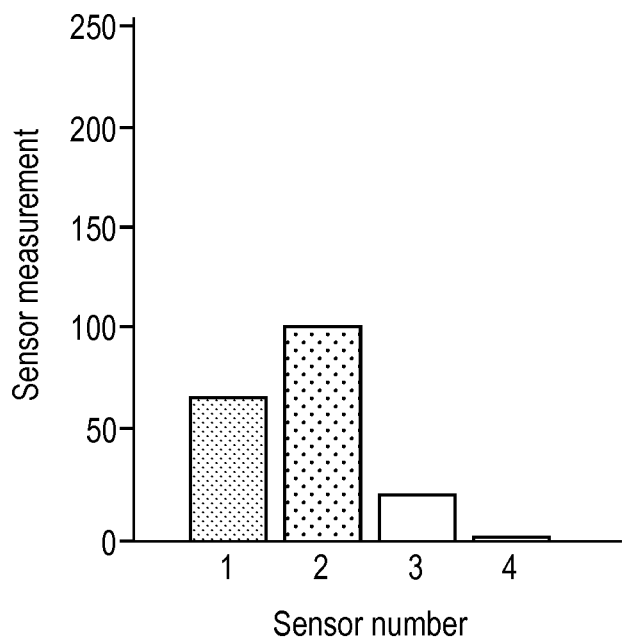
FIG. 9 is a graphical representation of simulated sensor output, in accordance with an embodiment.

FIGS. 8 and 9 show an example of sensor output simulation for a particular device position and orientation. In the example shown in FIGS. 8 and 9, sensor/detector measurements are obtained from four sensors, one located at the front side of the device (sensor 2), one at the back side of the device (sensor 4), one at the left side (sensor 1), and one at the right side (sensor 3). When the user is cleaning outside surfaces of the teeth (as shown), three of the sensors are partially or fully directed towards different parts of the user's body 50 and those sensors generate a correspondingly higher output. The second sensor points most directly at the user's face and has the largest output. The fourth sensor, in contrast, is directed away from the user's body 50 and has a low or zero output. Changing the orientation of the personal care device so that the operating component of the head member tilt more upwards or downwards causes the distribution of the output signals from sensors 1-3 to change. Thus, an example feature which is indicative of the user cleaning the outside surface of the teeth is that the signal from sensor 2 is larger than that from sensor 4. This may be extended by applying a feature that compares the signal levels from sensors 1 and 3 in order to detect whether the operating component is tilted more upwards or downwards.

At step 350 of the method, the system or device extracts one or more discriminative features from the generated sensor data using signal processing. According to an embodiment, a discriminative feature can be created by normalizing the data from all sensors which tends to remove information about depth of the head member within the mouth. The normalized data leaves information about the head member and operating component pointing direction relative to the user's head. The distribution of levels across the sensors may then be matched to an expected pattern in order to extract the operating component angle. Discriminative features can be used to indicate the user is cleaning a particular surface of a tooth (for example, inner, chewing, or outer surface), for example.

At step 360 of the method, the system or device estimates a position and/or an orientation of the handheld personal care device relative to the user's body based on the feature values. In an example embodiment, the algorithm or inverse function, i.e., the function that estimates the position and orientation of the device given a set of detector measurements, is created using machine learning algorithms. The inverse function can also be created using a heuristic approach according to embodiments. In a heuristic approach, understanding of the sensor and user characteristics is applied to identify features in the sensor data which can be related to the position and/or orientation of the device relative to the user's body. In further embodiments, the inverse function can be created using both heuristic and machine learning approaches.

Figure 10:
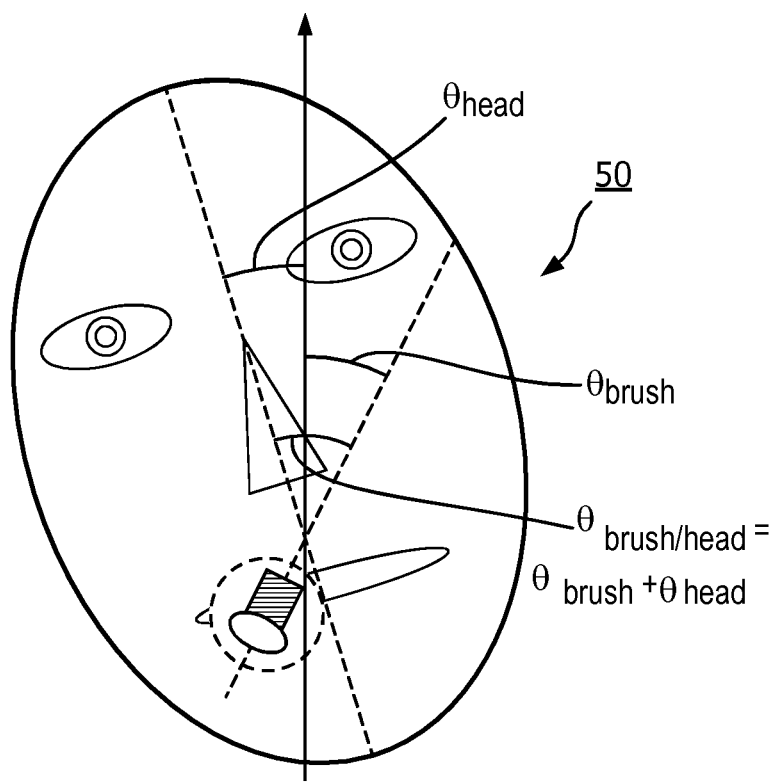
FIG. 10 is a schematic representation combining multiple sensor technologies, in accordance with an embodiment.

As shown in FIG. 10, in a further embodiment, data from one or more motion sensors is combined with the energy emission sources and detectors described herein to allow improved performance of the location/orientation sensing through a process of data fusion. For example, data from motion sensors, for example, accelerometers and gyroscopes, can be used to estimate the angle $\theta_{brush}$ between the device and the vertical direction (gravity). The sensors formed from energy emission sources and detectors 20, 22 can provide an estimate of the device's orientation with respect to the user's body $\theta_{brush/head}=\theta_{brush}+\theta_{head}$. By combining both measurements appropriately, it is possible to obtain a more precise estimation of the device's position and orientation with respect to the user's body 50. It is also possible to obtain an estimate of the orientation of the user's body with respect to the world $\theta_{head}$.

Figure 11:
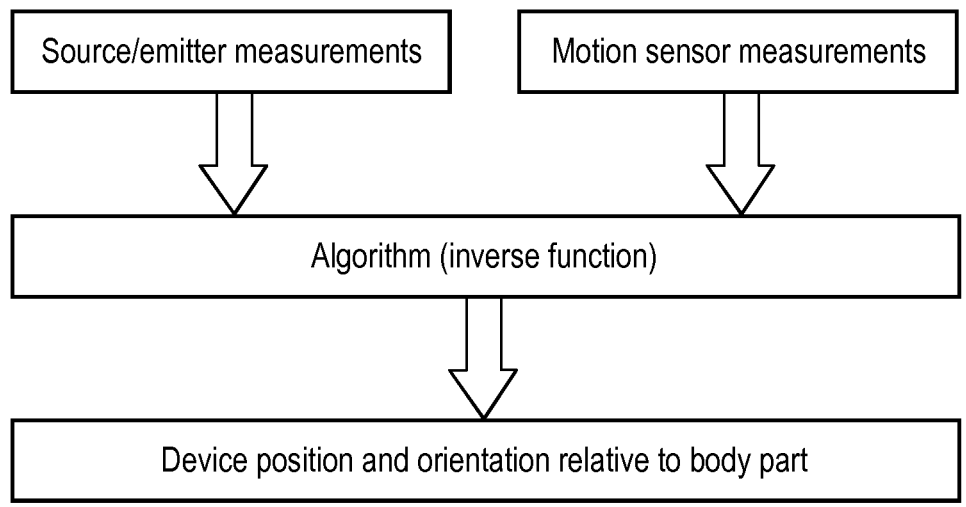
FIG. 11 is a flowchart of a method for combining measurements from motion sensors and the sensors formed from energy emission sources and detectors, in accordance with an embodiment.
Figure 12:
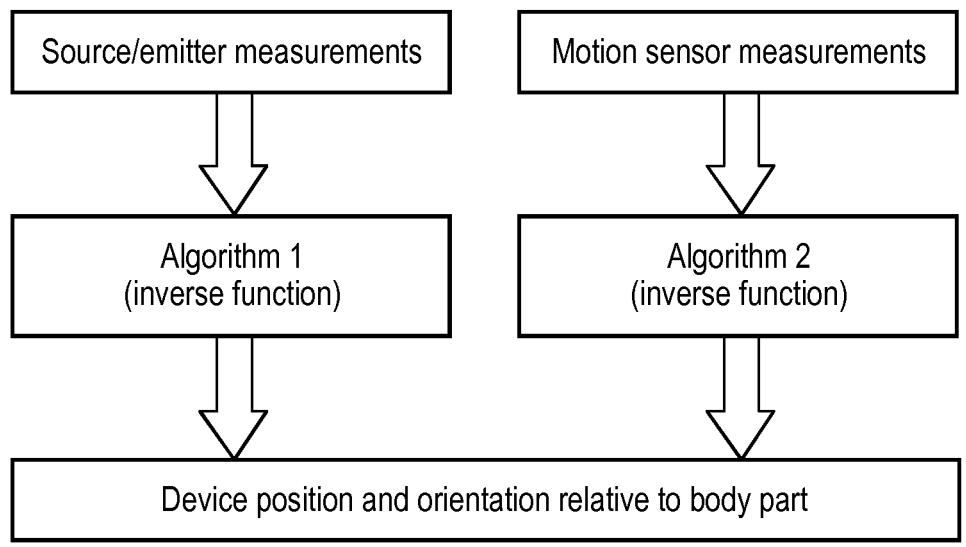
FIG. 12 is a flow chart of a method for combining measurements from motion sensors and the sensors formed from energy emission sources and detectors, in accordance with an embodiment.

The measurements from motion sensors and the sensors formed from energy emission sources and detectors can be combined by adding the motion sensors' data as input for a machine learning algorithm as illustrated in FIG. 11. The measurements from motion sensors and the sensors formed from sources and detectors can also be combined by processing the two sets of measurements separately and then combining the outputs in a second step as illustrated in FIG. 12. In an embodiment, the fusion step can be a weighted average of the outputs of the two algorithms or more sophisticated methods such as Kalman filtering could be used.

In a further embodiment, alternatively or additionally to any of the aforementioned methods or systems described above, the detected energy may be used to determine the motion of the personal care device relative to the user.

Such a method may comprise the step of determining the motion of the personal care device relative to the user in addition to the estimating at least one of a position and an orientation of a portion of the handheld personal care device relative to the user's body based on the extracted one or more features.

Alternatively, the method may comprise the step of determining the motion of the personal care device relative to the user as an alternative to the estimating at least one of a position and an orientation of a portion of the handheld personal care device relative to the user's body based on the extracted one or more features. The method may allow for either functionality to be selected. For example, the method may comprise determining the motion of the personal care device relative to the user and/or estimating at least one of a position and an orientation of a portion of the handheld personal care device relative to the user's body based on the extracted one or more features. Furthermore, the estimated position/orientation of the personal care device may be used to characterize the motion of the personal care device. For example, if various steps of the method are repeated such that a plurality of positions/orientations are estimated, the motion of the personal care device between these positions/orientations may be characterized. This may be achieved by detecting a portion of the energy emitted from the at least one energy source at different times, generating sensor data based on the detected portion of energy, extracting one or more features from the generated sensor data, and estimating a plurality of positions/orientations based on the extracted features, and characterizing the motion of the personal care device based on the extracted features.

Figure 13:
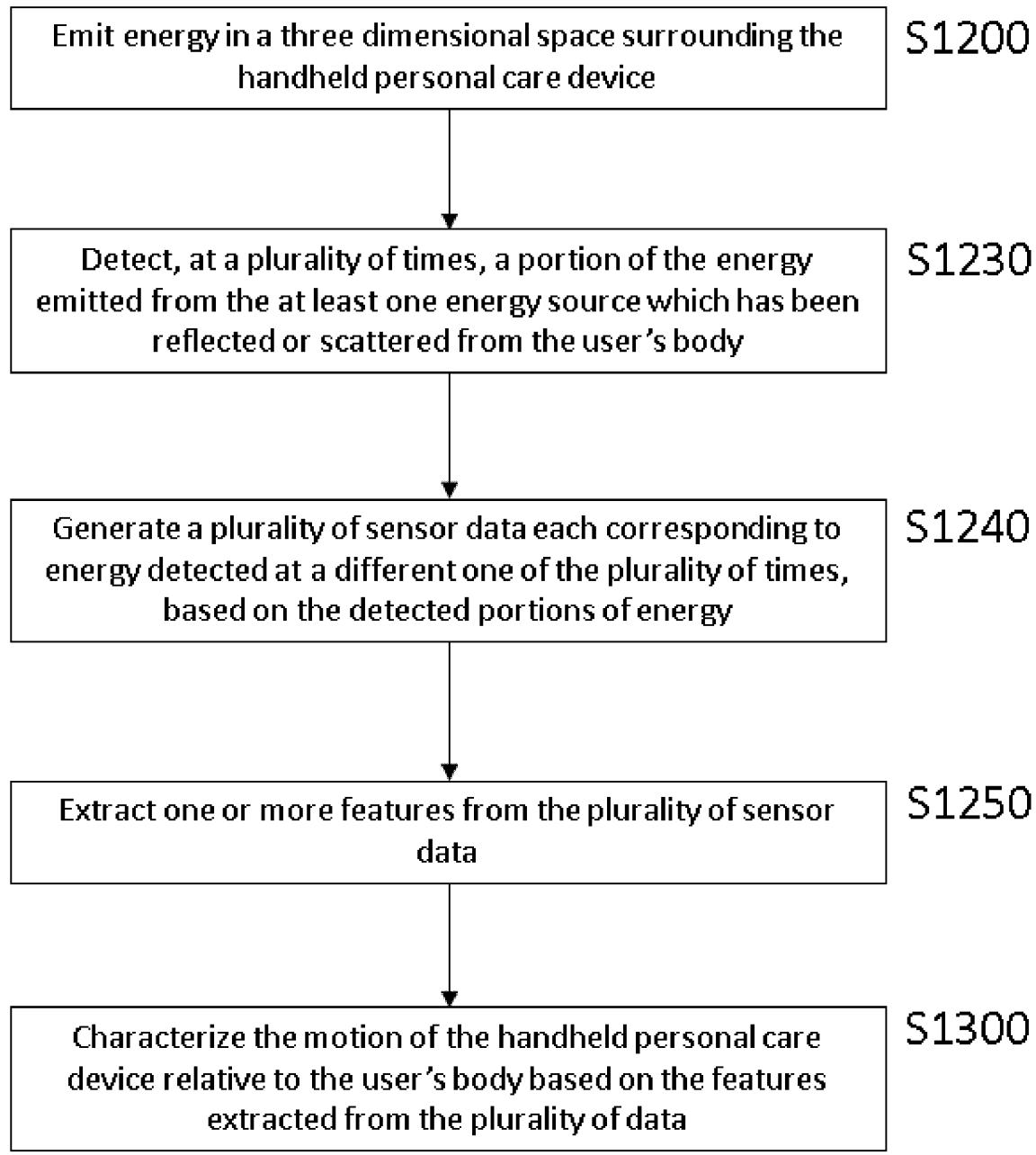
FIG. 13 is a flow chart of a method for characterizing the motion of the handheld personal care device relative to the user's body, in accordance with an embodiment.

FIG. 13 is a flow chart illustrating this method, and comprises the steps of:

Step 1200: Emit energy in a three dimensional space surrounding the handheld personal care device;

Step S1230: Detect, at a plurality of times, a portion of the energy emitted from the at least one energy source which has been reflected or scattered from the user's body;

Step 1240: Generate a plurality of sensor data each corresponding to energy detected at a different one of the plurality of times, based on the detected portions of energy;

Step 1250: Extract one or more features from the plurality of sensor data; and Step 1300: Characterize the motion of the personal care device relative to the user's body based on the features extracted from the plurality of data.

As is described above, the handheld personal care device may emit energy from an energy source and detect a portion of the energy emitted from the energy source. Sensor data may be generated based on the detected portion of energy emitted from the energy source, at least one feature may be extracted from the plurality of sensor data. In this embodiment, sensor data is generated which corresponds to energy detected at the plurality of different times. Sensor data may be collected over a series of time points, for example, while the device is in use.

The features which have been extracted from the plurality of sensor data may be used to characterize the motion of the personal care device relative to the user's body. The characterizing may comprise determining the motion of the handheld personal care device relative to the user's body. The characterized motion may include information on the movement of the personal care device between different locations. Alternatively or additionally, characterized motion may include information of a general movement of the personal care device, for example, a map of the movement between positions, or groups of positions, which may be relative to the user's body or relative to a general coordinate in space. The motion may comprise the movement of the handheld personal care device between a range of first positions near to the body of a user and a range of second positions further from the body of the user than the first positions. The characterized motion may include information on the rate at which the personal care device moves relative to the user's body. For example, the characterized motion may include information on the rate of motion (speed) at which the personal care device moves between various positions relative to a user's face and/or body. For example, the speed at which the personal care device moves between a (range of) first position(s) near to the user's body and/or face and a (range of) second position(s) which is further from the user's body and/or face than the (range of) first position(s) (towards and away from a user's body) may be the characterized motion.

The features may be extracted using any of the algorithms or methods described above. The extracted features may comprise the position and/or an orientation of the personal care device relative to the user's body.

Alternatively or additionally, the extracted feature may comprise a frequency of motion. For example, Fourier analysis may be performed in order to separate the frequency components of the sensor data, and at least one frequency may be extracted from the sensor data. The extracted frequency may be the frequency of motion of the personal care device relative to the body of the user. The frequency of motion of the personal care device between a range of first positions near to the body of a user and a range of second positions further from the body of the user than the first positions may be determined by detecting the dominant frequency of the frequency components of the data (the dominant frequency being the frequency at which the signal has maximum amplitude (in the frequency domain)). For example, where the personal care device is a toothbrush, the dominant frequency (the frequency with the greatest amplitude) may be the frequency of motion of the personal care device towards and away from the user's face (e.g. a brushing motion). The frequency of motion may thus be extracted using maximal amplitude detection.

In an example, a Hann function may be applied to the sensor data, and the resulting windows of data processed using a Fast Fourier Transform (FFT) or a Hilbert Transform. For example, the sensor (time) data signal may be converted to the frequency domain using, for example, FFT, and subsequently the dominant frequency can be identified as being the frequency of motion. The frequency of motion may then be extracted using maximal amplitude detection.

Alternatively or additionally, the frequency of motion may be determined based on the number of times, and the time period in which, a signal representation (for example, a high pass filtered signal in which low frequencies have been removed) of the sensor data passes through zero (crosses an axis).

Alternatively or additionally, band-pass filtering may be used to determine the frequency of motion. For example, three band-pass frequency filters (an upper, lower and middle band) may be applied to the sensor data. The energy of the frequencies in each band of the band-pass may be determined, for example by calculating the root mean square (RMS) value for each band. By comparing the RMS value of the bands, and determining which of the bands has the largest RMS value (and therefore comprises the highest energy signal) the dominant brushing frequency (and thus the frequency of motion) may be determined as a frequency which the determined band includes.

Additionally or alternatively, the extracted feature may comprise an amplitude, for example, the amplitude of the sensor data signal. Fourier analysis may be performed in order to separate the frequency components of the data. The amplitude of the dominant frequency may then be determined and extracted.

Alternatively or additionally, the distance between consecutive extrema (maxima or minima) in the sensor data may be used to determine the amplitude.

The motion of the personal care device relative to the user's body may be characterized based on the one or more extracted features, for example, the motion of the personal care device relative to the user's body may be characterized based on an extracted frequency (and an extracted amplitude).

The motion of a personal care device may be characterized in relation to the body (or face) of a user. Examples of suitable personal care devices in which the method or system may be implemented include a toothbrush, a shaver or other grooming device, a flossing device, an oral irrigator, a tongue cleaner, a skin care device, or other handheld personal care device. For example, where the personal care device is a shaver, the motion of the shaver over the face of a user may be characterized (e.g. a map of the relative movement of the shaver to the face of the user may be produced, and/or periodic motion of the shaver may be detected). The characterized motion may be compared to a predetermined motion using any of the methods described above or below, and/or the result of the comparison may be indicated to a user and/or stored.

The extracted feature may be the frequency of motion of the personal care device between a range of first positions near to the body of a user and a range of second positions further from the body of the user than the first positions. Thus, the characterized motion may be the frequency of motion of the personal care device between a range of first positions near to the body of a user and a range of second positions further from the body of the user than the first positions. The characterized motion may therefore indicate the rate (frequency) at which the personal care device moves between positions.

The characterized motion may also be determined using an extracted amplitude in combination with the extracted frequency of motion. The extracted amplitude may indicate the distance that the personal care device moves between a range of first positions near to the body of a user and a range of second positions further from the body of the user than the first positions. Thus, the combination of the extracted amplitude and the extracted frequency of motion may provide information on the distance travelled by the personal care device over a particular time frame, therefore indicating the rate (speed) at which the personal care device moves between positions.

One example of a motion which may be detected as the characterized motion in a personal care device is a scrubbing motion. A scrubbing motion may be performed when the user is moving a toothbrush periodically over a tooth segment too quickly (i.e. at too high a frequency for the time period). The scrubbing motion may also be detected in other devices, and may relate to any motion between first and second positions, however, in this example, the scrubbing motion is defined as mentioned above. A scrubbing motion performed using a power toothbrush is undesirable because a power toothbrush may be less effective in cleaning the teeth of a user when a scrubbing motion is performed. The frequency of motion at which the personal care device moves between a (range of) first position(s) near to the user's body and/or face and a (range of) second position(s) which is further from the user's body and/or face than the (range of) first position(s) may indicate the user performing a "scrubbing motion" with a personal care device such as a toothbrush. Additionally or alternatively, the rate of motion may be defined as at least one of: movement in a first direction away from the face of the user, movement towards the face of the user.

Figure 14:
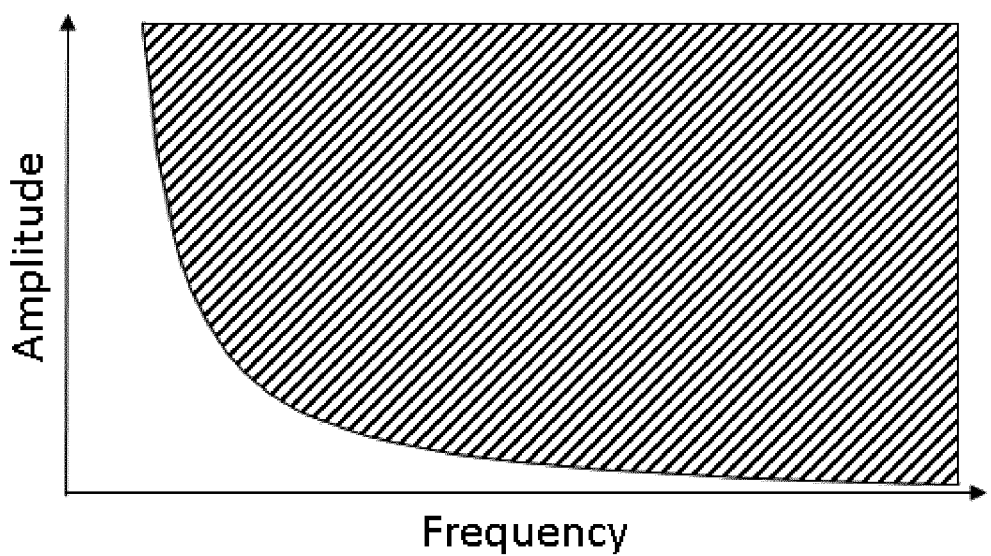
FIG. 14 is a graphical representation of predetermined motion detection.

A threshold motion may be defined as shown in FIG. 14. FIG. 14 is a graph showing a threshold for a desirable motion, where the region below the line is a desirable motion, and the region above the line is an undesirable (predetermined) motion. An indication of distance (indication of amplitude of motion, the distance that the personal care device moves in a first direction) is along the y axis, and frequency of motion is along the x axis. As is shown in this graph, a line indicating the threshold differentiating a desirable motion from an undesirable motion may be plotted, and the extracted frequency and/or amplitude may be used to determine whether the motion is in the shaded (undesirable) region above the line, or in the unshaded (desirable) region below the line. Thus, at low frequencies, a motion may be analyzed based on the relationship between the stroke length and the frequency of motion to see whether a characterized motion is a desirable or non-desirable motion.

In this example, above a certain frequency, the effect of the indication of distance in the determination of an undesirable motion being performed becomes negligible, and therefore the detected frequency alone can be used to determine if an undesirable motion is being performed. Therefore, a motion may be characterized based on a detection of a frequency of motion (above a threshold value), and/or using both the indication of distance (amplitude) and the frequency of motion.

As discussed, the extracted amplitude and the extracted frequency may be used to characterize motion, and this may be used as a basis for comparison to a desirable motion. For example, the extracted frequency may be used in combination with the extracted amplitude to determine whether the characterized motion lies within a threshold range of predetermined motion (undesirable motion). For example, if the value of the extracted frequency plotted against the value of the extracted amplitude lies within the shaded region of FIG. 14 (above the line), then it is determined that an undesirable motion is being performed.

Alternatively, an approximation may be made so that a threshold frequency may be compared to the extracted frequency, and if the extracted frequency exceeds the threshold frequency, it may be determined that an undesirable motion is being performed. Thus, the processing required in order to obtain a comparison is reduced.

For example, the characterized motion may be compared to a predetermined motion. The frequency of motion of the personal care device as discussed above may be compared to a predetermined frequency, for example, a desirable and/or threshold frequency (e.g. a frequency above which an undesirable motion is being performed). Information may be generated on the comparison of the characterized motion with the predetermined motion. For example, information on whether the frequency of motion (determined from the extracted frequency) exceeds a predetermined frequency may be determined (e.g. the information may be whether an undesirable motion is being performed). This information may be communicated to the user of the personal care device and/or stored. For example, the information may be indicated using haptic, audio and/or visual means. The information may be communicated through the personal care device itself, or through means such as a remote device (smartphone, smart watch, etc.), for example, through an application on a smartphone. The information may be stored, for example, in the personal care device itself, in a remote server (the personal care device may be in wireless communication with a remote server), a remote device such as a mobile phone, smart watch. Thus, information on use (movement) of the personal care device by a user may be collated.

In an example, if a scrubbing motion is detected based on the frequency of motion exceeding a predetermined frequency as is described above, information to that effect may be communicated to the user. For example, if a motion frequency target (predetermined motion) of 2 Hz is set, and the user exceeds a frequency of motion of 2 Hz for the movement of the personal care device to and from their face, the information that the user has exceeded the predetermined frequency, and is therefore performing a scrubbing motion, may be communicated to the user (and/or stored). In response to such a communication, the user may adjust their brushing motion accordingly.

The plurality of sensor data may be collected continuously, or may be collected at intervals. The sensor data may be sampled to collect the data. The sampling may occur at a frequency which is related to the expected motion of the personal care device. For example, in a toothbrush, the signal may be sampled at a frequency greater than an expected frequency for normal brushing, where the frequency of motion is the frequency at which the personal care device moves between a first position near to the user's face and a second position which is further from the user's face than the first position, as discussed above. For example, the sensor data may be sampled at a frequency (rate) which is (at least) twice the expected frequency. Thus, the sensor data may be sampled at a frequency which permits the collected data to accurately represent the motion of the personal care device relative to the body of a user.

The sensor data may be pre-processed before features are extracted. For example, the sensor data may be pre-processed to remove predetermined frequencies. Frequencies which are not related to the frequency of motion between the first and second locations discussed above (frequency information which does not relate to the general motion of the personal care device to and from a user's face) may be removed. The pre-processing may comprise applying low-pass filtering. For example, frequency components above 4 Hz may be unlikely to result from movement of the personal care device to and from a user's face. Therefore, low pass filtering may be used to filter out any frequencies in the sensor data which are above 4 Hz.

The pre-processing may comprise adding sensor signals gathered from at least one additional sensor. For example, the personal care device may comprise at least one additional detector. Alternatively or additionally, the personal care device may comprise any number of additional sensors, such as an Inertial Measurement Unit (IMU) and/or a Hall effect pressure sensor, and/or a camera. A composite sensor signal may be produced by combining the sensor data generated in relation to any of the sensors provided in the personal care device. A composite signal may be less sensitive to changes of orientation of the device but still contain information on the distance of the personal care device from the face and/or body of a user.

Figure 15:
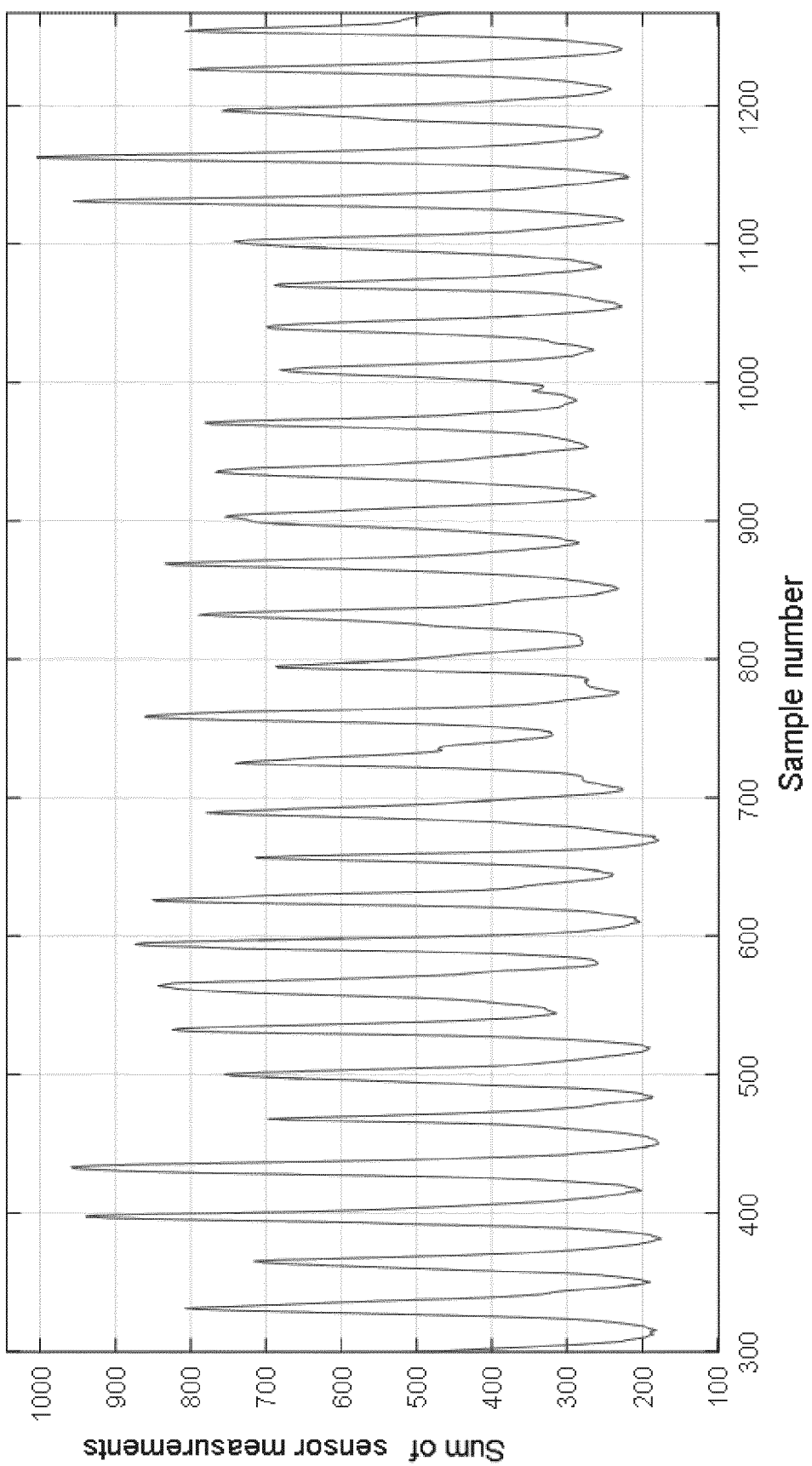
FIG. 15 is a graphical representation of multiple signals combined from multiple sensor sources.

FIG. 15 is an illustration of the data collected using the method of characterizing motion of a personal care device which comprises a composite signal produced by combining the sensor data generated from a plurality of sensors comprised in the personal care device. The peaks shown on the graph correspond to the personal care device being close to the face (a range of first positions near to the body of a user), and the troughs correspond to the personal care device being further from the face (a range of second positions further from the body of the user than the first positions). The composite signal shown in the graph of FIG. 15 corresponds to the sum of eight sensor signals measured by the device. As can be seen from this Figure, the motion of the personal care device to and from the face of the user may be characterized using the sensor data in any manner discussed above, for example, by extracting frequency and/or amplitude.

While several embodiments described herein include near infrared light energy sources and detectors, other types of energy can also be used. For example, alternative wavelengths of light, such as within the visible spectrum, radio frequency electromagnetic radiation forming a radar sensor, or electrostatic energy, such as in a mutual capacitance sensor can also be used. The sensor output can be derived from different aspects of the detected energy such as magnitude of the detected energy and/or phase or time delay between the energy source and the detected signal, time of flight.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Statements:

1. A method (200) for determining a position and an orientation of a portion of a handheld personal care device relative to a user's body (50), the method comprising the steps of:

providing (210) a handheld personal care device comprising at least one energy source (20) and at least one detector (22), both the at least one energy source and the at least one detector located within the handheld personal care device, the at least one energy source arranged at a first position and having a first orientation within the handheld personal care device;

emitting (220), by the at least one energy source, energy in a three dimensional space surrounding the handheld personal care device;

detecting (230), by the at least one detector, a portion of the energy emitted from the at least one energy source;

generating (240), by the at least one detector, sensor data based on the detected portion of the energy emitted from the at least one energy source;
extracting (250) one or more features from the generated sensor data; and estimating (260) a position and an orientation of a portion of the handheld personal care device relative to the user's body based on the extracted one or more features.

2. The method of statement 1, wherein the step of detecting the portion of the energy emitted from the at least one energy source comprises detecting energy reflected or scattered from the user's body.

3. The method of statement 1, further comprising the step of processing the sensor data generated by the at least one detector to create one or more features which correlate with a position or orientation of the handheld personal care device in use.

4. The method of statement 1, further comprising the step of arranging the at least one detector at a second position and having a second orientation within the handheld personal care device, wherein the second position and the second orientation of the at least one detector are different than the first position and the first orientation of the at least one energy source.

5. The method of statement 1, wherein the at least one energy source is a light-emitting diode and the emitted energy is near infrared light energy and the at least one detector is a photodetector.

6. The method of statement 1, wherein the at least one energy source and the at least one detector are arranged in a module that is attachable to the handheld personal care device.

7. The method of statement 1, further comprising the step of combining a first set of measurements comprising the generated sensor data with a second set of measurements from one or more motion sensors.

8. The method of statement 7, wherein the step of combining the first and second sets of measurements further comprises the step of processing the first and second sets of measurements together.

9. The method of statement 7, wherein the step of combining the first and second sets of measurements further comprises the steps of processing the first and second sets of measurements separately to form first and second outputs, respectively, and then combining the first and second outputs.

10. A method (200) for determining an orientation of a portion of a handheld personal care device relative to a user's body (50), the method comprising the steps of:
providing (210) a handheld personal care device comprising at least one energy source (20) and at least one detector (22), both the at least one energy source and the at least one detector located within the handheld personal care device, the at least one energy source arranged at a first position and having a first orientation within the handheld personal care device;
emitting (220), by the at least one energy source, energy in a three dimensional space surrounding the handheld personal care device;
detecting (230), by the at least one detector, a portion of the energy emitted from the at least one energy source;
generating (240), by the at least one detector, sensor data based on the detected portion of the energy emitted from the at least one energy source;
extracting (250) one or more features from the generated sensor data; and
estimating (260) an orientation of a portion of the handheld personal care device relative to the user's body based on the extracted one or more features.

11. The method of statement 10, wherein the step of detecting the portion of the energy emitted from the at least one energy source comprises detecting energy reflected or scattered from the user's body.

12. The method of statement 10, further comprising the step of arranging the at least one detector at a second position and having a second orientation within the handheld personal care device, wherein the second position and the second orientation of the at least one detector are different than the first position and the first orientation of the at least one energy source.

13. The method of statement 10, further comprising the step of combining a first set of measurements comprising the generated sensor data with a second set of measurements from one or more motion sensors.

14. The method of statement 10, wherein the at least one energy source and the at least one detector are arranged in a module that is attachable to the handheld personal care device.

15. A method (200) for determining a position of a portion of a handheld personal care device (10) relative to a user's body (50), the method comprising the steps of:
providing (210) a handheld personal care device comprising at least one energy source (20) and at least one detector (22), both the at least one energy source and the at least one detector located within the handheld personal care device;
emitting (220), by the at least one energy source, energy in a three dimensional space surrounding the handheld personal care device;
detecting (230), by the at least one detector, a portion of the energy emitted from the at least one energy source;
generating (240), by the at least one detector, sensor data based on the detected portion of the energy emitted from the at least one energy source;
extracting (250) one or more features from the generated sensor data; and estimating (260) a position of a portion of the handheld personal care device relative to the user's body based on the extracted one or more features.

The invention claimed is:
1. A method for determining at least one of a position and an orientation of a portion of a handheld personal care device relative to a user's body, the method comprising:
emitting, by at least one energy source arranged at a first position in the handheld personal care device and having a first orientation within the handheld personal care device, energy in a three-dimensional space surrounding the handheld personal care device; wherein the at least one energy source is a light-emitting diode and the emitted energy is near infrared light energy,
detecting, by at least one photodetector arranged in the handheld personal care device, reflected or scattered energy, wherein the reflected or scatter energy comprises a portion of the energy emitted from the at least one energy source which has been reflected or scattered from the user's body;
generating, by the at least one photodetector, sensor data based on the detected reflected or scattered energy wherein the sensor data provides at least distance from the user's body to the at least one energy source and the at least one photodetector;

extracting one or more features which correlate with a position or an orientation of the handheld personal care device in use from the sensor data, wherein the one or more features depend on the distances from the user's body to the at least one energy source and the at least one photodetector, and/or the extent to which the user's body fills one or more three dimensional regions in the three dimensional space surrounding the handheld personal care device; and estimating at least one of a position or an orientation of a portion of the handheld personal care device relative to the user's body based on the extracted one or more features, and characterizing motion of the handheld personal care device relative to the user's body based on the extracted one or more features.

2. The method of claim 1, further comprising arranging the at least one photodetector at a second position and having a second orientation within the handheld personal care device, wherein the second position and the second orientation of the at least one photodetector are different than the first position and the first orientation of the at least one energy source.

3. The method of claim 1, wherein the at least one energy source and the at least one photodetector are arranged in a module that is attachable to the handheld personal care device.

4. The method of claim 1, further comprising combining a first set of measurements comprising the sensor data with a second set of measurements from one or more motion sensors.

5. The method of claim 4, wherein combining the first and second sets of measurements further comprises processing the first and second sets of measurements together.

6. The method as claimed in claim 1, further comprising comparing the characterized motion to a predetermined motion, and generating information on the comparison of the characterized motion with the predetermined motion.

7. The method as claimed in claim 6, wherein characterizing the motion comprises determining the motion of the handheld personal care device relative to the user's body.

8. The method as claimed in claim 7, wherein characterizing the motion comprises determining a rate of motion at which the handheld personal care device moves between positions relative to the user's body.

9. The method as claimed in claim 8, wherein the rate of motion is based on a frequency of motion at which the handheld personal care device moves between a range of first positions near to the user's body and a range of second positions further from the user's body than the first positions, and wherein the extracted one or more features comprises the frequency of motion.

10. The method as claimed in claim 9, wherein the rate of motion is further based on an amplitude corresponding to a distance between the range of first positions and the range of second positions; and wherein the extracted one or more features comprises the amplitude; frequency.

11. The method as claimed in claim 9, wherein characterizing the motion comprises determining whether the frequency of motion is greater than a predetermined frequency.

12. The method as claimed in claim 1, wherein extracting the one or more features further comprises pre-processing the sensor data before extracting the features.

13. The method as claimed in claim 12, wherein the pre-processing comprises removing predetermined frequencies from each of the sensor data before extracting the features.

14. The method as claimed in claim 12, wherein the pre-processing comprises at least one of applying low-pass filtering or adding signals from at least one additional sensor.

15. The method as claimed in claim 1, wherein the at least one of the position or the orientation of the portion of the handheld personal care device relative to the user's body is estimated using an inverse function.

16. A handheld personal care device, comprising:
at least one energy source configured to emit energy towards a user's body in a three dimensional space surrounding the handheld personal care device, and being arranged at a first position and having a first orientation within the handheld personal care device; and at least one photodetector configured to receive and detect a portion of the energy emitted from the at least one energy source that has been reflected or scattered from the user's body in response to the at least one energy source emitting energy towards the user's body, and to generate sensor data based on the detected portion of the energy emitted from the at least one energy source, wherein the sensor data provides at least distance from the user's body to the at least one energy source and the at least one photodetector.

17. The handheld personal care device as claimed in claim 16, chosen from a group of handheld personal care devices comprising: an oral care device, a toothbrush, a shaver, an oral irrigator, a flossing device, a body portion for receiving a head member for any of the foregoing devices and a head member for any of the foregoing devices.

18. The handheld personal care device as claimed in claim 16, further comprising:
a controller configured to extract one or more features that correlate with a position or an orientation of the handheld personal care device in use from the sensor data, wherein the one or more features depend on the distances from the user's body to the at least one energy source and the at least one photodetector, and/or the extent to which the user's body fills one or more three dimensional regions in the three dimensional space surrounding the handheld personal care device, and to estimate at least one of a position or an orientation of a portion of the handheld personal care device relative to the user's body based on the extracted one or more features.

19. The handheld personal care device as claimed in claim 16, further comprising:
a controller configured to extract one or more features that correlate with a position or an orientation of the handheld personal care device in use from the sensor data, wherein the one or more features depend on the distances from the user's body to the at least one energy source and the at least one photodetector, and/or the extent to which the user's body fills one or more three dimensional regions in the three dimensional space surrounding the handheld personal care device, and to estimate at least one of a position or an orientation of a portion of the handheld personal care device relative to the user's body based on characterizing motion of the handheld personal care device relative to the user's body based on the extracted one or more features.

* * * * *